United States Patent

Kirsten

[11] Patent Number: 6,098,266
[45] Date of Patent: Aug. 8, 2000

[54] METHOD FOR THE PRODUCTION OF ROTORS FOR SCREW-TYPE COMPRESSORS

[76] Inventor: Guenter Kirsten, Erzbergerstrasse 13, 08451 Crimmitschau, Germany

[21] Appl. No.: 08/860,698

[22] PCT Filed: Jan. 17, 1996

[86] PCT No.: PCT/EP96/00175

§ 371 Date: Jul. 9, 1997

§ 102(e) Date: Jul. 9, 1997

[87] PCT Pub. No.: WO96/22870

PCT Pub. Date: Aug. 1, 1996

[30] Foreign Application Priority Data

Jan. 26, 1995 [DE] Germany .......................... 195 02 323

[51] Int. Cl.[7] .................................................. B22D 25/02
[52] U.S. Cl. .................. 29/527.1; 29/527.5; 29/888.023
[58] Field of Search ........................ 418/201.3; 29/527.1, 29/527.5, 530, 888.023

[56] References Cited

U.S. PATENT DOCUMENTS

| | | | |
|---|---|---|---|
| 3,787,154 | 1/1974 | Edstom | 418/201.3 |
| 4,614,484 | 9/1986 | Riegler | 418/201.3 |
| 4,636,156 | 1/1987 | Hough et al. | 418/201.3 |

FOREIGN PATENT DOCUMENTS

| | | | |
|---|---|---|---|
| 1704236 | 5/1971 | Germany . | |
| 3448025 | 5/1986 | Germany . | |
| 3506475 | 8/1986 | Germany . | |
| 3903067 | 8/1990 | Germany . | |
| 3271587 | 12/1991 | Japan | 29/888.023 |

*Primary Examiner*—John J. Vrablik
*Attorney, Agent, or Firm*—Diller, Ramik & Wight, PC

[57] ABSTRACT

The invention is directed to a method for the production of rotors (10) for screw-type compressors (16) and to rotors (10) to be produced according to said method. To allow the use of a straightforward manufacturing method for the production of rotors (10) of a complex geometry, a method is proposed wherein, during the production of the negative mold, material is removed from a negative mold blank to generate correction regions of a rotor (10).

4 Claims, 8 Drawing Sheets

METHOD FOR THE PRODUCTION OF ROTORS FOR SCREW-TYPE COMPRESSORS

BACKGROUND OF THE INVENTION

The invention is directed to a method for the production of rotors for screw-type compressors, and rotors to be produced by said method.

For the production of rotors for a screw-type compressor, use is made—besides machining production techniques—of master mold techniques wherein the rotor is produced by filling a negative mold with a suitable rotor material. The terms "master mold techniques" or "master molding" are used to define a method wherein a first mold is produced from loose material by generating the required cohesion of material (primary shaping). An example of a master mold technique is a casting process wherein a master mold is filled with material. A master mold technique specially adapted to the production of rotors is known from DE 40 35 534 A1. According to this method, rotors for screw-type compressors are produced from fiber-reinforced synthetic material by stacking disks of such fiber-reinforced synthetic material upon each other in the hollow cavity of a negative mold and connecting them to each other by application of heat and pressure.

Also the negative mold is generated by a master mold technique wherein a representation is produced of the contour of a master rotor, the master rotor corresponding in shape to the rotor to be produced.

Due to the double use of a master mold technique, the shape of the rotor to be inserted into the screw-type compressor is determined by the master rotor. The master rotor is usually produced by a machining technique. However, the tools used for producing the master rotor, e.g. slotting or grinding machines, which generate the three-dimensionally curved surface of the teeth, require cutout portions for the application of the tools. For forming the tooth-root regions, it is up to now required that rounded deepened portions are worked by use of a tool into cylindrical outer surfaces extending concentrically to the rotor axis. These rounded deepened portions are necessary to allow the application of the tool used for working on the tooth flanks.

When a rotor comprising such rounded deepened portions is to be inserted into a screw-type compressor together with a second rotor, the second rotor must have the tips of its teeth provided with edges which engage the rounded deepened portions during meshing. On the other hand, it is not possible to effect a sufficient sealing between the rotors. However, the edges of the second rotor enlarge its diameter and thus the diameter of the housing portion enclosing the second rotor. The enlargement of the diameter of said housing portion and the rounded portions of the edges cause a deterioration of the sealing properties in the engagement region of the two rotors. Before the teeth of the rotors during the rolling movement in the respective cross section come into mutual abutment, a so-called blow-hole lies therebetween, allowing compressed gases flowing back therethrough to the low pressure side.

Thus, the rotor geometry due to the manufacturing conditions will result in backflow losses which cause low efficiency in known screw-type compressors.

SUMMARY OF THE INVENTION

It is an object of the invention to produce rotors of a complex geometry by use of a straightforward manufacturing method.

For providing a screw-type compressor having an increased efficiency, it is required to optimize the rotors with respect to their flow and sealing behavior. This, however, can be accomplished only if such an optimized geometry of the rotors can also be manufactured in an industrial production process. The solution of the object of the invention is based, on the one hand, on a concept for an improved geometry for the rotors and, on the other hand, on the provision of a manufacturing method which allows for mass production of such rotors. In this regard, the manufacturing method and the corresponding rotors are two different aspects of the design concept forming basis of the invention.

The rotors produced by use of a master mold have a geometry which is determined by the geometry of the master mold. The geometry of the master mold is directly reproduced in the rotors manufactured by use of the master mold. Therefore, by changing the geometry of the negative mold, the geometry of the resultant rotor can be determined. If, for instance, it is detected that a rotor exhibits an unfavorable flow behavior and if it is then found out in what manner the rotor geometry has to be changed for improving the flow behavior, changes can be made in the geometry of the negative mold to optimize the geometry of the rotor. Thus, by performing a corrective treatment of the negative mold, rotors can be produced to have a corrected rotor geometry as compared to earlier production series.

The flow and sealing behavior is determined particularly by the configuration of the tooth-root regions of the winding teeth of the primary rotor. The secondary rotor meshing with the primary rotor must have corresponding cylindrical outer surfaces formed on the tips of its teeth. Due to the novel geometry of the primary rotor, there can be used a secondary rotor having a small diameter and comprising no rounded portions on the tips of its teeth. This provision makes it possible, first, that the housing portion surrounding the secondary rotor can enclose the engagement region of the two rotors still more tightly and, second, that during the meshing movement of the two rotors the blow-hole is closed faster when the teeth come into mutual engagement. Thus, by the novel geometries of the primary rotor and the secondary rotor, the blow-hole delimited by the housing and the rotors is reduced both under the aspects of time and space. Both aspects lead to a reduction of the backflow losses. By producing rotors using a master mold technique, it becomes possible to reproduce the complex geometries with high precision and relatively low expenditure.

A further advantage resides in the improved sealing between the tips of the teeth of the secondary rotor and the housing portion surrounding the secondary rotor. The cylindrical outer surfaces of the tips of the teeth provide a better sealing effect than the rounded edges according to the state of the art.

According to the invention, a method is provided wherein improvements of the geometry of rotors to be inserted into screw-type compressors are considered already when generating the negative mold. First, to this effect, a master rotor reproducing the shape of the winding teeth is produced by removing material from a master rotor blank. This master rotor, however, will then still comprise regions which do not yet have the geometry desired for the completed rotor and thus are in need of correction. A corresponding corrective treatment could be performed on the master rotor itself. According to the method according to the instant invention, however, this corrective treatment is performed by removal of material from the blank of the negative mold so that the negative mold is provided with deepened portions which serve for generating the complementary correction regions.

When the thus corrected negative mold is filled with suitable material for a rotor, the rotor will be formed with elevated portions corresponding to said deepened portions of the negative mold. These elevated portions improve the properties of the rotor in accordance with the desired geometry.

Preferably, the blank of the negative mold is subjected to an inside turning treatment. By this turning treatment, mold regions are generated which during manufacture of the positive rotor will form cylindrical outer surfaces extending continuously over the complete length of the rotor. This continuity safeguards a reliable sealing between the primary rotor and the secondary rotor.

Preferred embodiments of the invention will be described in greater detail hereunder with reference to the accompanying drawings.

DESCRIPTION OF THE PREFERRED EMBODIMENTS

Figure 1:
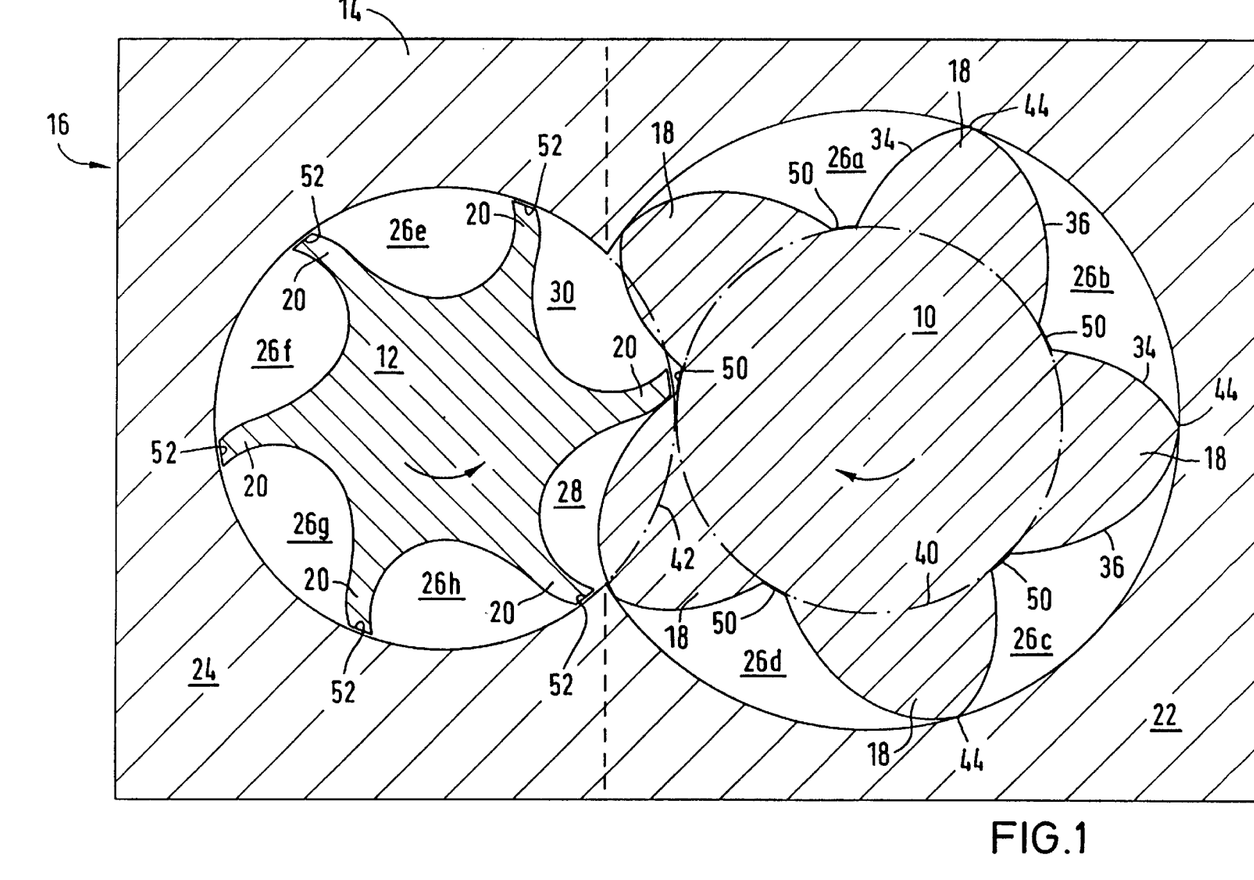
FIG. 1 is a sectional view of a rotor produced by the method of the invention, which together with an appertaining second rotor forms a rotor pair and is arranged in a compressor housing.

FIG. 1 is a view of a screw-type compressor 16 comprising a rotor 10 produced according to the invention, provided as a primary rotor and being supported in a common housing 14 with a further rotor 12 provided as a secondary rotor. The two rotors 10,12 mesh with each other within housing 14 so that air is conveyed in axial direction and is compressed. The primary rotor 10 has five teeth 18 formed thereon, being distributed at equal distances over its periphery and wound at an angle of about 240° along the length of primary rotor 10. The secondary rotor 12 meshing with primary rotor 10 has six teeth 20 formed thereon which are wound at an angle of about 180° along the length of secondary rotor 12.

Within housing 14, the two rotors 10,12 are surrounded by a first and resp. a second housing portion 22,24 in such a manner that tooth flanks 34,36 of the teeth 18 of primary rotor 10 and tooth flanks of the teeth 20 of secondary rotor 12 in combination with said first and resp. a second housing portions 22,24 define displacement chambers 26a to 26h. In the region before the pressure outlet of screw-type compressor 16, tooth flanks 34,36 of respective teeth 18 of primary rotor 10 and tooth flanks of respective teeth 20 of secondary rotor 12 define a discharge chamber 28 between them. Further, a suction chamber 30 is defined before the inlet.

The efficiency of the illustrated screw-type compressor 16 essentially depends on the tightness of the displacement chambers 26a to 26h, the discharge chamber 28 and the suction chamber 30, with the sealing behavior of the mutually meshing teeth 18,20 having a large influence on the efficiency of screw-type compressor 16.

For illustration of the sealing and flow conditions, a screw-type compressor 116 according to the state of the art is shown in FIGS. 2 to 5 and 8. This conventional screw-type compressor 116 is different from the screw-type compressor 16 including the inventive rotor 10 by essential details of the rotor design. To allow an easier survey, those elements of screw-type compressor 116 which correspond to elements of screw-type compressor 16 are designated by reference numerals increased by 100 over the numerals in FIG. 1.

Figure 3:
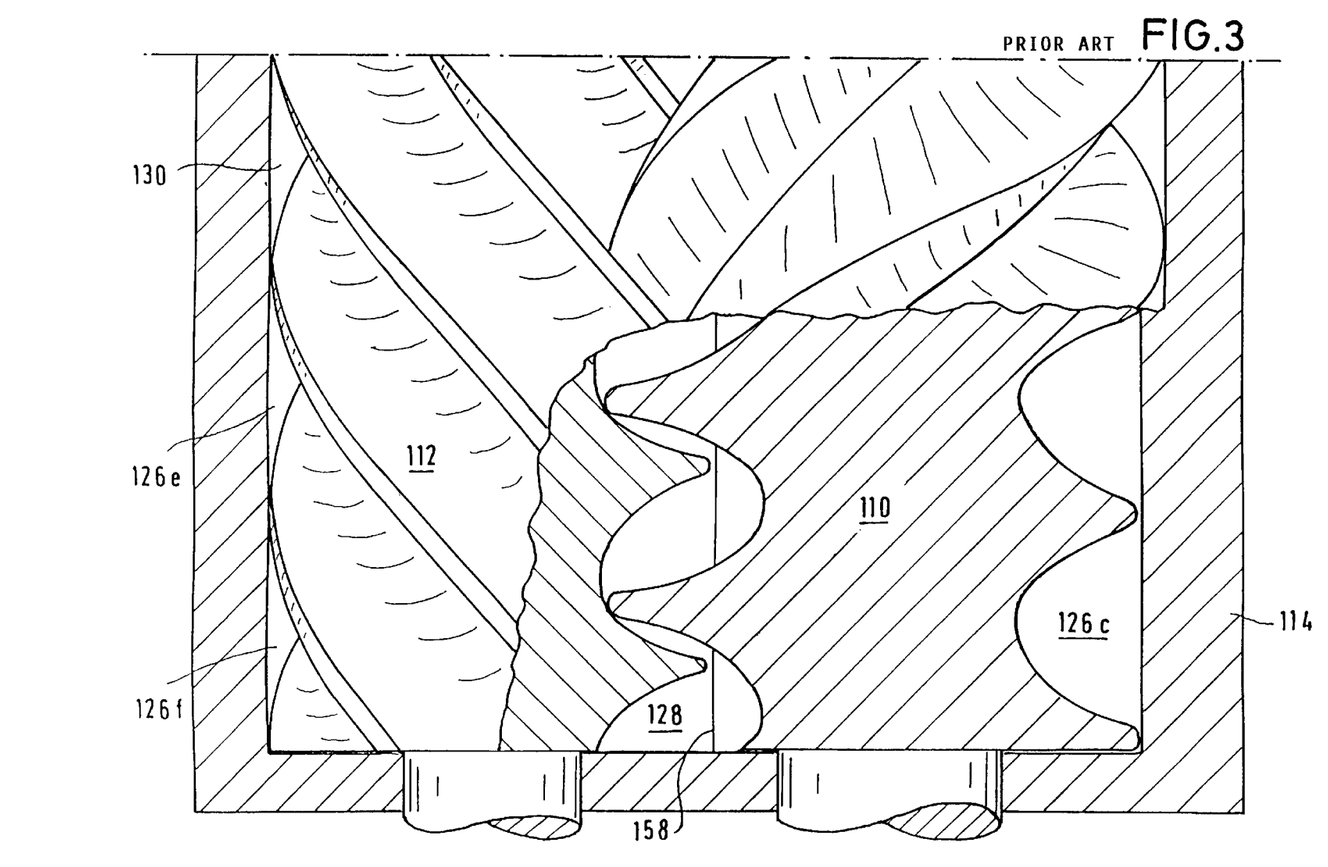
FIG. 3 is a plan view, partly broken away according to line III—III in FIG. 2, of the pair of rotors of FIG. 2, FIGS. 4a) to 4c) show an enlarged detail of FIG. 2, with the rotors arranged in different rotational positions, FIGS. 5a) to 5c) are sectional schematic views of the constellations according to FIGS. 4a) to 4c), FIGS. 6a) to 6c) show enlarged details of FIG. 1, with the rotors arranged in different rotational positions.

The spatial configuration of the displacement chambers 126a to 126h is illustrated in FIG. 3. The displacement chambers 126a to 126h are defined by the tooth flanks 134,136 of the teeth 118,120 of primary rotor 110 and resp. of secondary rotor 112 in combination with the respective housing portion 122,124. The displacement chambers 126a to 126h follow a helically winding course and partially extend over the complete length of rotors 110,112. Since, during operation, the rotors 110,112 rotate in opposite senses, the volume of the individual chambers will change permanently, while the tooth flanks 134,136 in cyclical change will successively define displacement chambers 126a to 126h, discharge chambers 128 and suction chambers 130. Each successive time, respectively two displacement chambers will be united to form a discharge chamber, and, after discharge of the pressurized gas, two discharge chambers will open again and form a suction chamber. Thereafter, the tooth flanks will define two separated displacement chambers.

Figure 2:
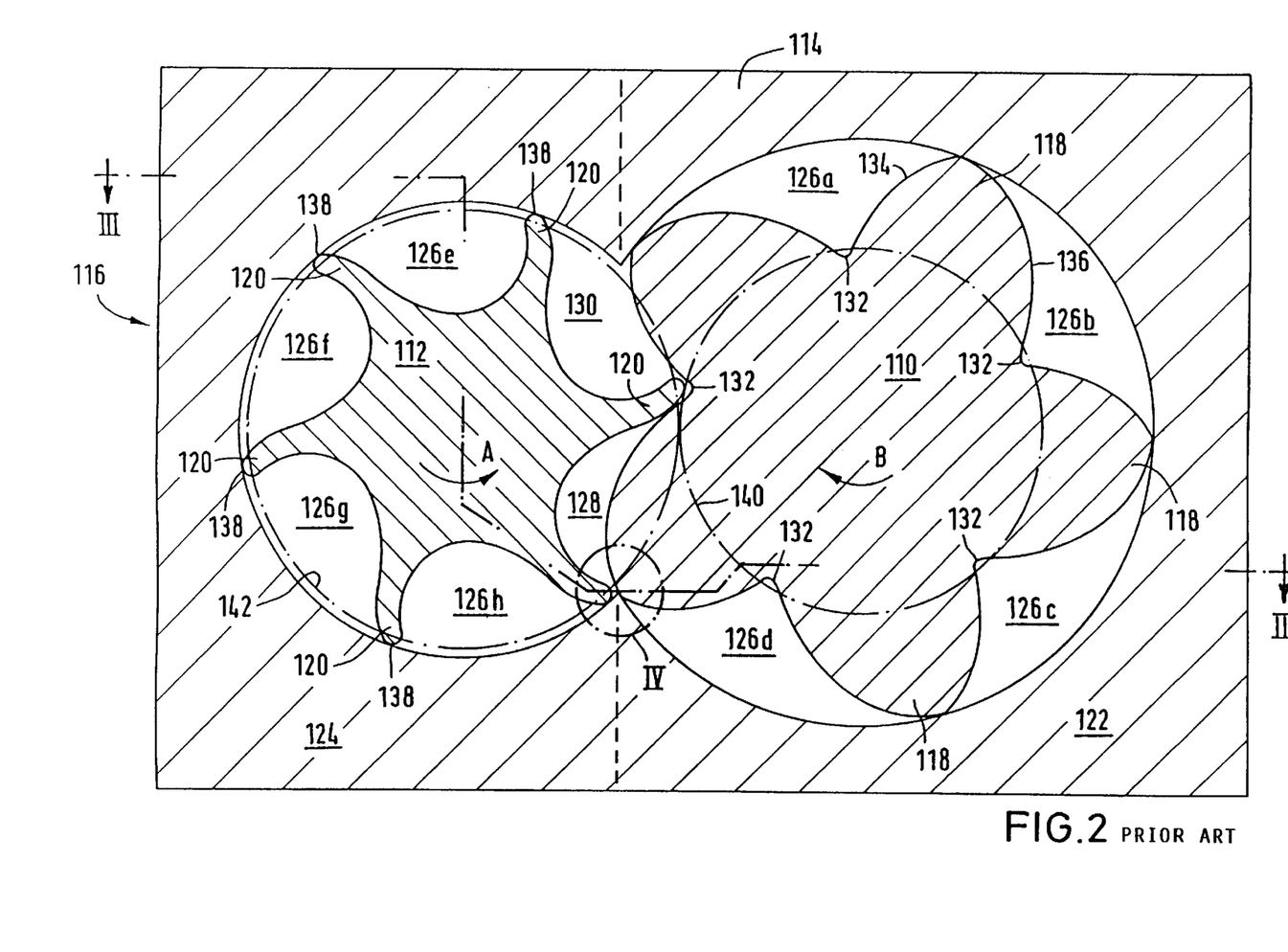
FIG. 2 is a view similar to FIG. 1 of a pair of rotors according to the state of the art.

If, for instance, the two rotors 110,112 in FIG. 2 are turned by a few angular degrees in the rotational senses indicated by arrows A and B, the displacement chambers 126a to 126h unite to form a discharge chamber. Simultaneously, the volume of the existing discharge chamber 128 is reduced so that the gas enclosed in discharge chamber 128 is exhausted at an increased pressure. At the same time, the volume of the suction chamber 130 which extends up to the suction side of the screw-type compressor 116, is increased. Thus, gas to be compressed is sucked in.

The primary rotor 110 shown in FIG. 2 has been produced by machining and thus comprises rounded deepened portions 132 in each of its tooth-root regions. Said rounded deepened portions 132 are required for allowing the tooth flanks 134,136 to be treated by use of suitable tools. To cause the primary rotor 110 and the secondary rotor 112 to roll against each other with a sealing effect while the rotors are meshing with each other, the secondary rotor 112 has each of its teeth 120 provided with a rounded edge 138 which engages the respective rounded deepened portion 132 of primary rotor 110 while the two rotors 110,112 are meshing.

The rounded deepened portions 132 of the primary rotor 110 are located within the rolling circle 140 of primary rotor 110. Accordingly, the edges 138 of secondary rotor 112 are located outside the rolling circle 142 of secondary rotor 112.

Figure 4A:
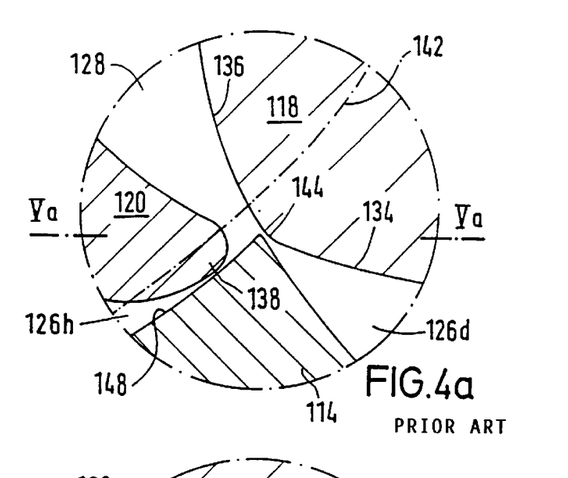
Figure 4B:
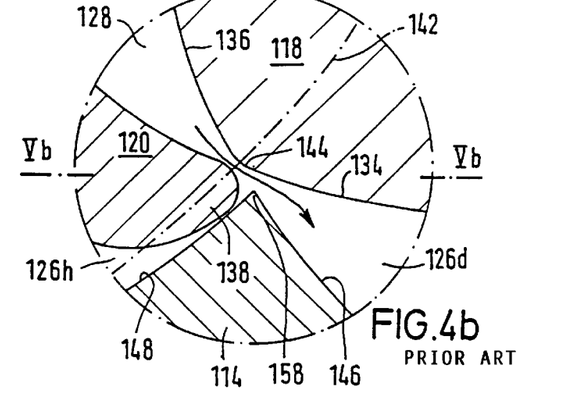
Figure 4C:
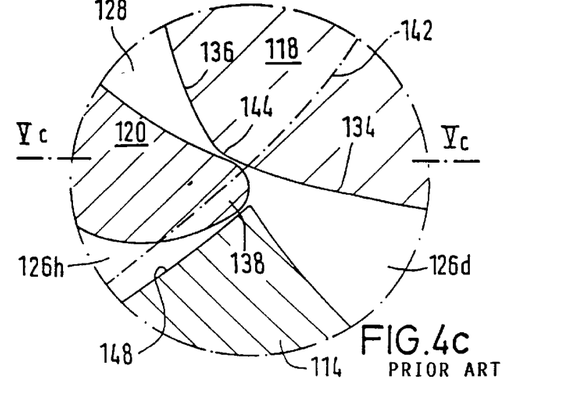
Figure 5A:
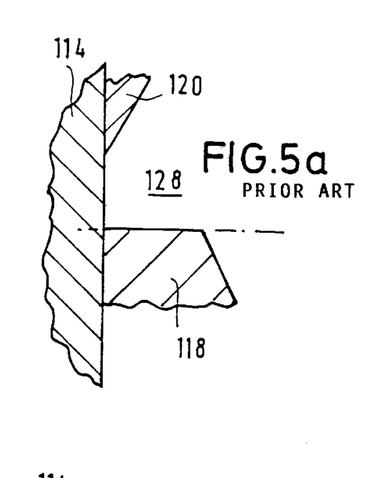
Figure 5B:
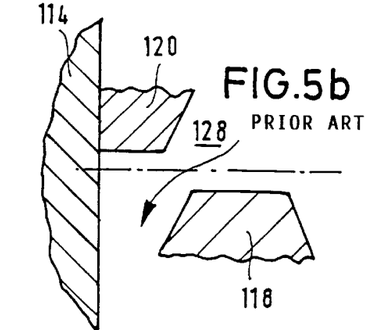
Figure 5C:
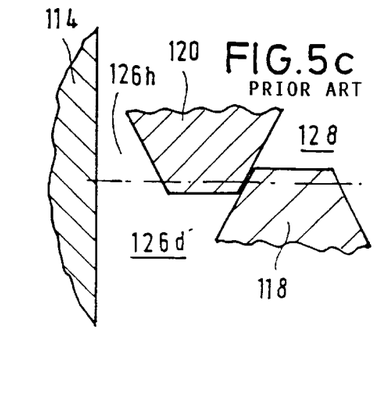

The flow conditions generated in the engagement region (detail IV in FIG. 2) during the meshing of the two rotors 110,112 are illustrated in FIGS. 4a to 4c, and the resultant sealing and flow conditions are illustrated in FIGS. 5a to 5c.

During the rotational movement of the two rotors 110,112, the teeth 118 of primary rotor 110 with their peak line 144—delimiting the tooth flanks 134,136—will travel along a cylindrical surface 146 of first housing portion 122. In a corresponding manner, the edges 138 of the teeth 120 of secondary rotor 112 will travel along a second cylindrical surface 148 of second housing portion 124. The edges 138 and the peak lines 144 by their respective cylindrical surfaces 146,148 form sealing members. Thereby, the displacement chambers 126d, 126h and the discharge chamber 128 are separated from each other (FIGS. 4a,5a). However, when the rotors are turned still further, the condition shown in FIG. 4b will be reached in which the peak line 144 of the tooth 118 of primary rotor 110 does not form a sealing anymore with the cylindrical surface 146. In this rotational position, pressurized gas can flow back from discharge chamber 128 into displacement chamber 126. This backflow is represented by an arrow in FIG. 5b. Only when the rotors 110,112 have been turned into the position shown in FIG. 4c and the tooth 120 of secondary rotor 112 has come into abutment with the tooth 118 of the primary rotor 110, the new discharge chamber 128 formed by the displacement chambers is sealed tight.

In contrast to the state of the art, the primary rotor 10 according to the invention (FIG. 1) comprises, instead of rounded portions, first cylindrical outer surfaces 50 arranged on the rolling circle 40 of the primary rotor 10. In correspondence thereto, the secondary rotor 12 comprises second cylindrical outer surfaces 52 arranged on the rolling circle 42 of the secondary rotor 12.

Figure 6A:
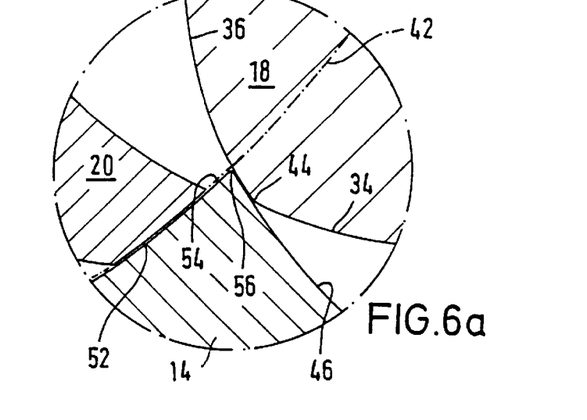
Figure 6B:
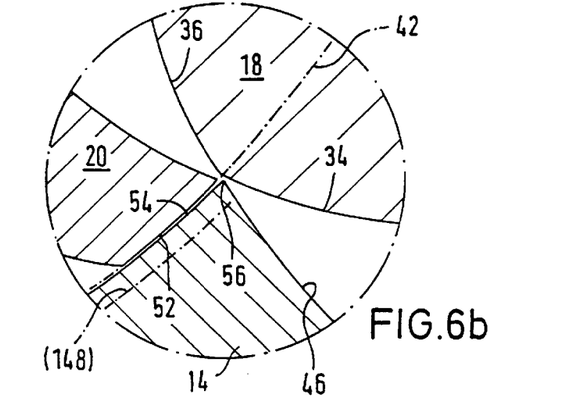
Figure 6C:
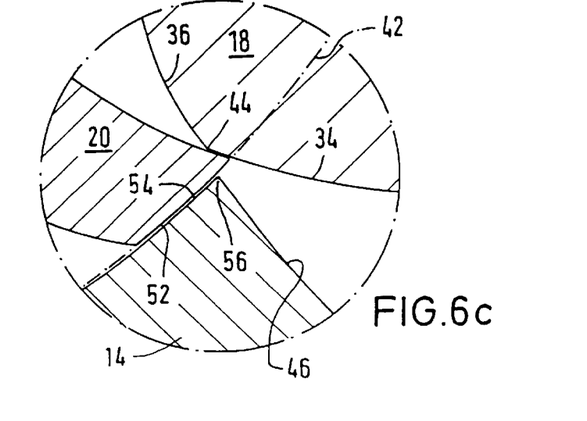

The flow and sealing conditions resulting from the use of the inventive rotor are shown in FIGS. 6a–6c. To obtain a sealing effect between the rotors 10,12 and housing 14, the teeth 18 of primary rotor 10 in combination with a cylindrical surface 46 of housing 14 form first sealings, and the second cylindrical outer surfaces 52 of the teeth 20 of secondary rotor 12 in combination with a cylindrical surface 54 of housing 14 form second sealings. Since the secondary rotor 12, with otherwise unchanged rolling conditions, has a smaller diameter than the secondary rotor 112 according to the state of the art, the housing edge 56 defined by said cylindrical surfaces 46 and 54 is situated closer to the point of the mutual engagement of the teeth 18,20 of the two rotors 10,12 than is the case with the corresponding edge 158 in the state of the art (FIG. 6b). Thereby, the size of the blow-hole is reduced.

Further, the teeth 20 of secondary rotor 12 are brought into engagement with the teeth 18 of primary rotor 10 without delay because the secondary rotor 20 does not comprise rounded portions formed on the edges on the tips of its teeth (FIG. 6c). Thus, the blow-hole which opens shortly in each cross section during the meshing process, is closed again considerably earlier than in the state of the art.

Figure 7:
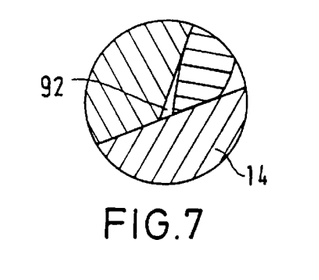
FIG. 7 is a view of a blow-hole delimited by the rotors and the housing shown in FIG. 1.
Figure 8:
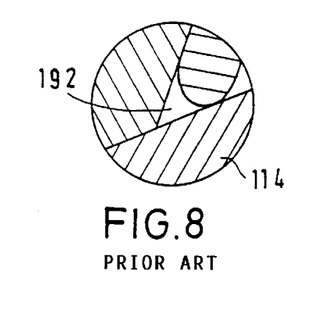
FIG. 8 is a view of a blow-hole delimited by the rotors and the housing shown in FIG. 2.

A comparison between the sizes of the blow-holes can be made with reference to FIGS. 7 and 8. FIG. 7 shows the blow-hole 92 produced in a rotor according to the invention. FIG. 8 shows the blow-hole 192 opening in rotors according to the state of the art.

Since the size of the blow-hole is decisive for the backflow losses occurring, such a comparison makes it clearly evident that the instant rotor configuration offers considerable improvements of the efficiency of a screw-type compressor.

Figure 9:
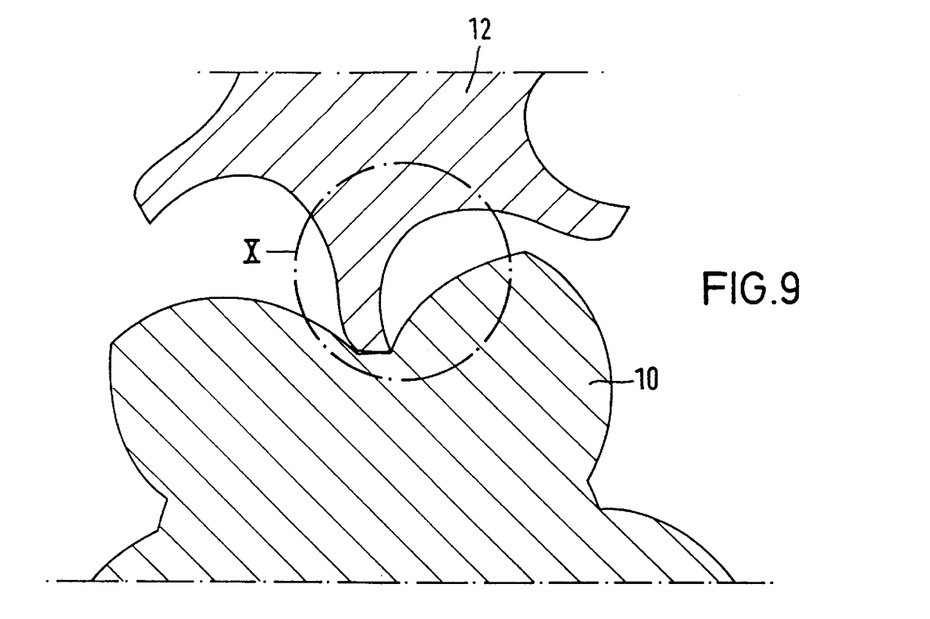
FIG. 9 is a sectional view of the pair of rotors according to FIG. 1 in a further engagement position of the rotors.
Figure 10:
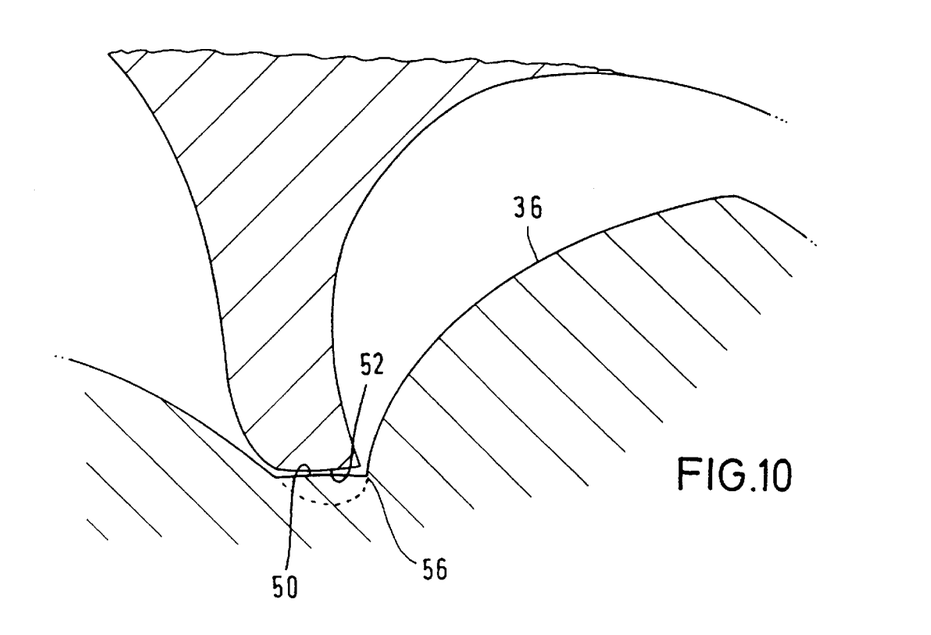
FIG. 10 shows an enlarged detail of FIG. 9.

FIGS. 9 and 10 show the rotors of FIG. 1 in a further turning position. It is clearly visible that even during the mutual engagement of the two rotors the first and second cylindrical outer surfaces 50,52 form a reliable sealing. Both cylindrical outer surfaces 50,52 extend continuously so that the gap which during rolling is formed therebetween in successive sections has a consistent width. The continuous cylindrical outer surface 50 in combination with the tooth flank 36 defines a helical line 56 which presents a sharp edge, effecting a reduction of flow losses.

FIGS. 11 to 14 are illustrative of the method for producing a negative mold for the rotor shown in FIG. 1 and of the production of a rotor shown using such a negative mold.

Figure 11:
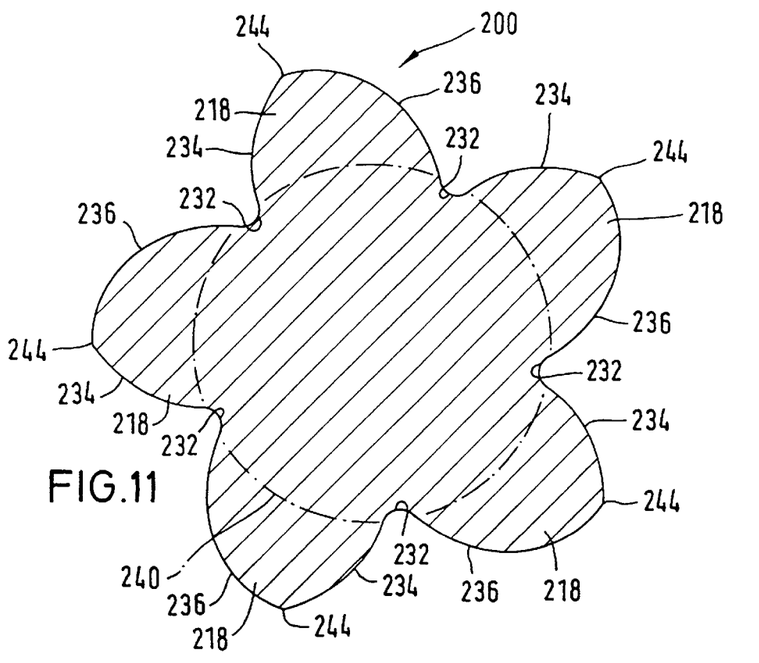
FIG. 11 is a view of the master rotor for producing one of the two rotors according to FIG. 1.

FIG. 11 shows a master rotor 200 which, corresponding to the primary rotor to be produced therewith, comprises five helically winding teeth 218. The tooth flanks 234,236 have a contour which, in the region between a peak line 244 formed by the tooth flanks 234,236 and the rolling circle 240 of master rotor 200, is the same as the contour of the teeth 10 of the inventive primary rotor 10 and the primary rotor 110 according to the state of the art. Since the master rotor 200, as is the case for the primary rotor 110 according to the state of the art, is produced from a master rotor blank by machining, it comprises rounded deepened portions 232 below the rolling circle 240.

Figure 12:
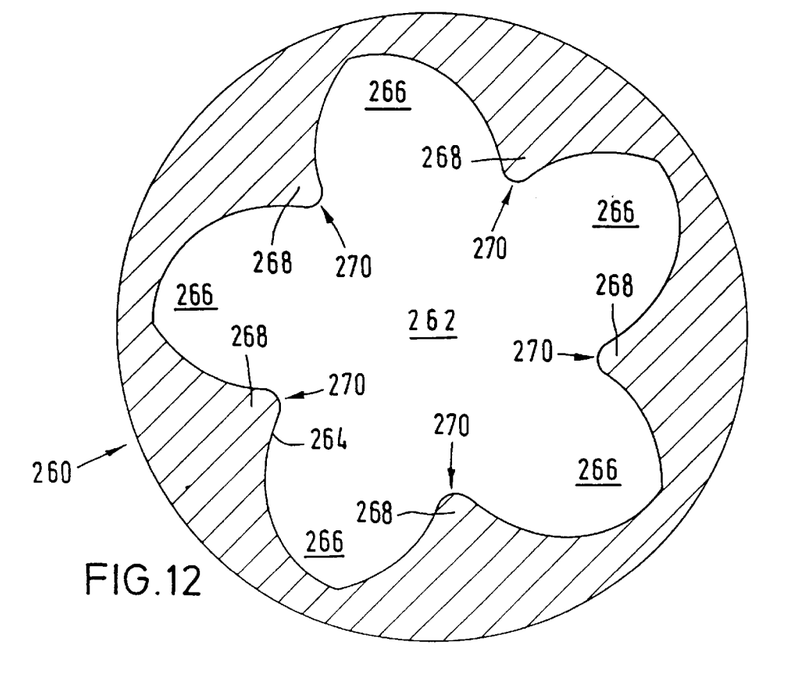
FIG. 12 is a view of a blank of a negative mold having a geometry taken from the master rotor according to FIG. 11.

The thus produced master rotor is first placed into a mold box, and the cavity between the mold box and the master rotor is filled with a suitable mold material which is then cured. In its cured condition, the mold material forms the negative mold blank 260.

After the curing of the mold material, the master rotors is taken out of the negative mold blank 260 so that a cavity 262 remains. The contour 264 of cavity 262 comprises helically winding deepened portions 266 whose geometry is complementary to the geometry of the teeth of a primary rotor. Arranged between the deepened portions 266 are helically winding protruding regions 268.

Figure 13:
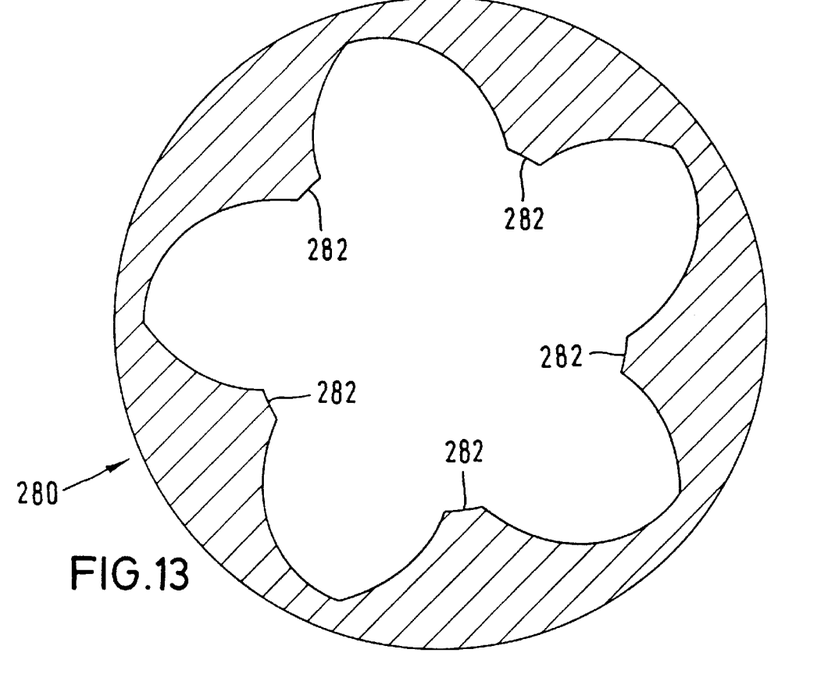
FIG. 13 is a view of a negative mold produced by an inside turning treatment of the negative mold in FIG. 12.

For further treatment, the negative mold blank 260 is clamped into a turning lathe, in which raised molded edges 270 of the protruding regions 268 are removed by an inside turning treatment. By this treatment, there is obtained a negative mold 280 comprising hollow-shaped, helically winding, continuous cylindrical surfaces 282.

Figure 14:
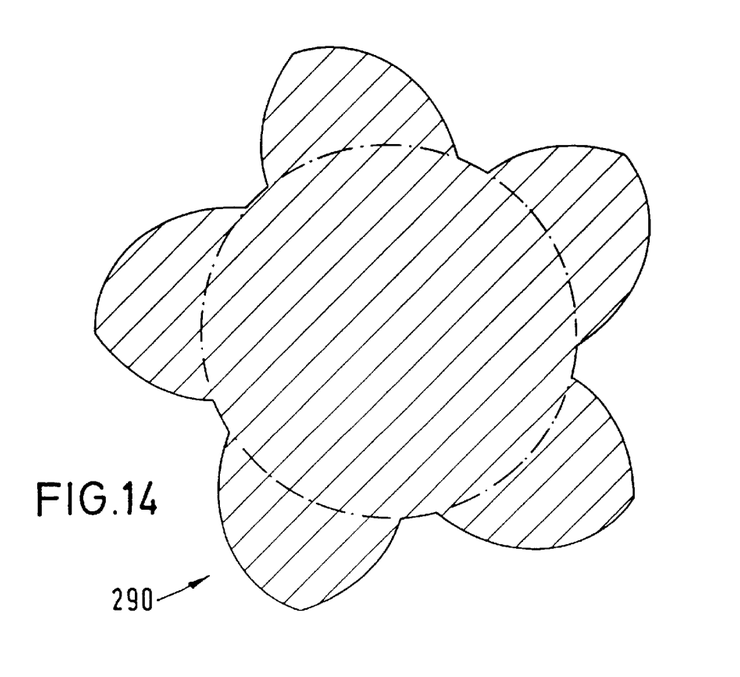
FIG. 14 is a view of a rotor produced by use of the negative mold of FIG. 12.

By filling the negative mold shown in FIG. 13 with a suitable rotor material and by curing the material, the primary rotor 290 of FIG. 14 is produced, its geometry coinciding with that of the primary rotor 10 of FIG. 1.

Although a preferred embodiment of the invention has been specifically illustrated and described herein, it is to be understood that minor variations may be made in the apparatus without departing from the spirit and scope of the invention, as defined the appended claims.

I claim:

1. A method for the production of rotors for screw-type compressors using a master mold technique, comprising the following steps:

a) producing a master rotor representing the shape of the winding rotor teeth, by removal of material from a master rotor blank, b) producing a negative mold blank by taking up the shape of the master rotor, c) producing a negative mold by removal of material from the negative mold blank to create deepened portions provided to generate correction regions, d) taking up the contour of the negative mold by filling the negative mold with loose rotor material and curing said material, and e) separating the rotor from the mold.

2. The method according to claim 1, characterized in that rounded portions in the tooth-root regions generated during production of the master rotor, are corrected by the removal of protrusions in the negative mold blank which have been generated by said rounded portions.

3. The method according to claim 2, characterized in that corrections of the profile of the negative mold blank are performed by an inside turning treatment performed on the negative mold blank.

4. A method for the production of a negative mold for a rotor to be inserted into a screw-type compressor and having a plurality of helically winding teeth formed thereon, comprising the following steps:

a) producing a master rotor representing the shape of the winding rotor teeth, by removal of material from a master rotor blank, b) producing a negative mold blank by taking up the shape of the master rotor, c) removal of material from the negative mold blank to create deepened portions provided to generate correction regions.

* * * * *